(12) United States Patent
Stanhill

(10) Patent No.: US 8,587,705 B2
(45) Date of Patent: Nov. 19, 2013

(54) HARDWARE AND SOFTWARE PARTITIONED IMAGE PROCESSING PIPELINE

(75) Inventor: David Stanhill, Hoshaya (IL)

(73) Assignee: Intel Corporation, Santa Clara, CA (US)

(*) Notice: Subject to any disclaimer, the term of this patent is extended or adjusted under 35 U.S.C. 154(b) by 529 days.

(21) Appl. No.: 12/825,010

(22) Filed: Jun. 28, 2010

(65) Prior Publication Data

US 2011/0317047 A1  Dec. 29, 2011

(51) Int. Cl.
| | |
|---|---|
| H04N 3/14 | (2006.01) |
| H04N 5/335 | (2011.01) |
| H04N 9/04 | (2006.01) |
| H04N 9/083 | (2006.01) |
| H04N 5/235 | (2006.01) |
| G06K 9/32 | (2006.01) |

(52) U.S. Cl.
USPC ........ 348/277; 348/222.1; 348/272; 382/298; 382/299

(58) Field of Classification Search
USPC ......... 348/222.1, 66, 272–282, 266; 382/293, 382/298–302
See application file for complete search history.

(56) References Cited

U.S. PATENT DOCUMENTS

| | | | | |
|---|---|---|---|---|
| 5,790,205 A | * | 8/1998 | Pettitt et al. | 348/629 |
| 5,838,010 A | * | 11/1998 | Pedersen | 250/369 |
| 6,628,330 B1 | | 9/2003 | Lin | |
| 7,324,707 B2 | * | 1/2008 | Huang et al. | 382/300 |
| 7,609,307 B2 | * | 10/2009 | Tsai et al. | 348/273 |
| 7,787,442 B2 | * | 8/2010 | Akahane et al. | 370/352 |
| 7,826,658 B2 | * | 11/2010 | Sato et al. | 382/165 |
| 8,145,014 B2 | * | 3/2012 | Kwak et al. | 382/300 |
| 2001/0045988 A1 | * | 11/2001 | Yamauchi et al. | 348/273 |
| 2002/0003578 A1 | * | 1/2002 | Koshiba et al. | 348/273 |
| 2005/0276230 A1 | * | 12/2005 | Akahane et al. | 370/252 |
| 2006/0050159 A1 | * | 3/2006 | Ahn | 348/272 |
| 2006/0055794 A1 | * | 3/2006 | Sato et al. | 348/222.1 |
| 2006/0078229 A1 | * | 4/2006 | Huang et al. | 382/300 |
| 2007/0009165 A1 | * | 1/2007 | Kumar et al. | 382/240 |
| 2007/0242081 A1 | * | 10/2007 | Jeong et al. | 345/606 |
| 2008/0013801 A1 | * | 1/2008 | Reed et al. | 382/118 |
| 2008/0013855 A1 | | 1/2008 | Kikuchi | |
| 2008/0062479 A1 | * | 3/2008 | Tsai et al. | 358/518 |
| 2009/0066821 A1 | * | 3/2009 | Achong et al. | 348/273 |
| 2009/0136127 A1 | * | 5/2009 | Kwak et al. | 382/167 |
| 2009/0196498 A1 | * | 8/2009 | Quan | 382/167 |

(Continued)

FOREIGN PATENT DOCUMENTS

WO  2012/009077 A1  1/2012

OTHER PUBLICATIONS

International Search Report and Written Opinion for PCT application No. PCT/US2011/040124, mailed on Dec. 19, 2011, 7 Pages.

(Continued)

*Primary Examiner* — Chia-Wei A Chen
(74) *Attorney, Agent, or Firm* — Jordan IP Law, LLC

(57) ABSTRACT

Methods and systems may provide for an image processing pipeline having a hardware module to spatially filter a raw image in the horizontal direction to obtain intermediate image data. The pipeline can also include a set of instructions which, if executed by a processor, cause the pipeline to spatially filter the intermediate image data in the vertical direction.

15 Claims, 3 Drawing Sheets

(56) References Cited

U.S. PATENT DOCUMENTS

2009/0226115 A1* 9/2009 Urard et al. .................. 382/298
2010/0097491 A1 4/2010 Farina et al.
2010/0202262 A1* 8/2010 Adams et al. ............. 369/47.15
2011/0148888 A1* 6/2011 Jacobs et al. ................. 345/502
2012/0044391 A1* 2/2012 Ni et al. ....................... 348/242
2012/0182441 A1* 7/2012 Sharman et al. .......... 348/222.1

OTHER PUBLICATIONS

International Preliminary Report on Patentability for PCT application No. PCT/US2011/040124, mailed on Jan. 10, 2013, 6 pages.

* cited by examiner

HARDWARE AND SOFTWARE PARTITIONED IMAGE PROCESSING PIPELINE

BACKGROUND

Digital cameras include image processing pipelines that re-sample and spatially filter (e.g., interpolate) raw image data. For example, camera pipeline components such as de-mosaicing, down-sampling, optical distortion correction and chromatic aberration correction components could all apply interpolation techniques to a single image. Conventional image processing pipelines may implement these functions in series and entirely in hardware. Such series processing could degrade the image quality due to the application of several low-pass type filters in succession. Conducting the interpolation fully in hardware can also have efficiency shortcomings. Each of these concerns may be particularly relevant in high data rate operation modes such as preview and video recording.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may provide for a method in which a hardware module is used to spatially filter a raw image in a horizontal direction to obtain intermediate image data. The method can also involve the use of software to spatially filter the intermediate image data in a vertical direction.

Embodiments can also include an apparatus having a hardware module to spatially filter a raw image in a horizontal direction to obtain intermediate image data. In addition, the apparatus may include a computer readable storage medium including a set of stored instructions which, if executed by a processor, cause the apparatus to spatially filter the intermediate image data in a vertical direction.

Other embodiments may include a system having a processor, an image sensor to generate a raw image, and a hardware module to spatially filter the raw image in a horizontal direction to obtain intermediate image data. The system can also include a computer readable storage medium including a set of stored instructions which, if executed by the processor, cause the system to spatially filter the intermediate image data in a vertical direction.

Figure 1:
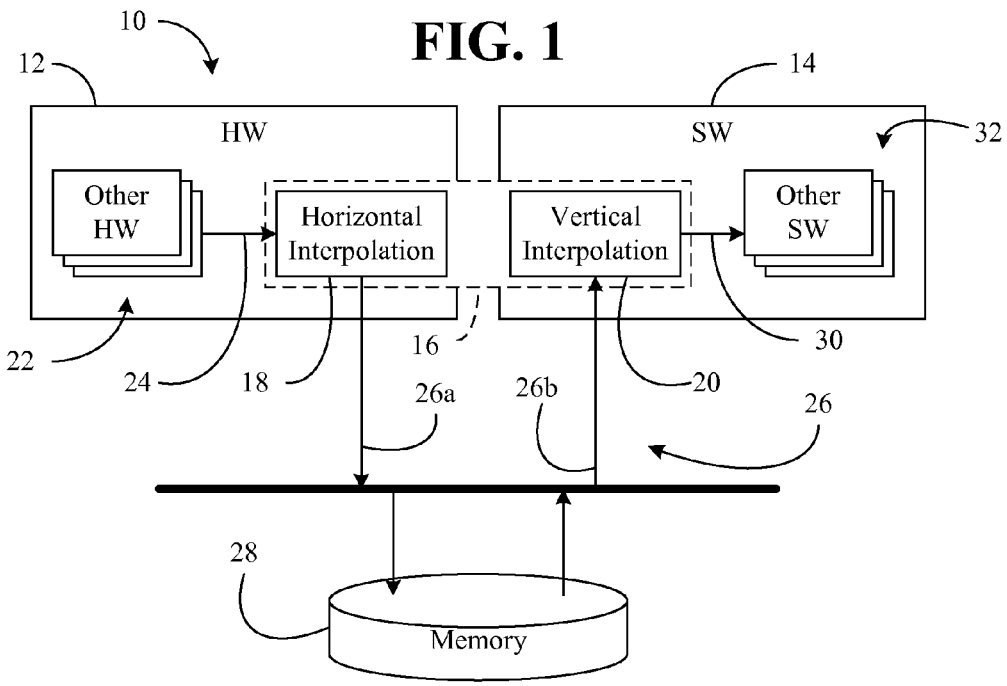
FIG. 1 is a block diagram of an example of an image processing pipeline according to an embodiment.

Turning now to FIG. 1, an image processing pipeline 10 is shown. In the illustrated example, the pipeline 10 includes an interpolation section 16 that can generally be used to spatially filter raw images 24 from other hardware processing modules 22 (e.g., bad pixel correction), such that the spatial filtering may provide for de-mosaicing, down-sampling, optical distortion correction and chromatic aberration correction of the raw images 24 as needed. The interpolation section 16 may be implemented partially in a hardware (HW) portion 12 of the pipeline 10 and partially in a software (SW) portion 14 of the pipeline 10. In particular, the illustrated interpolation section 16 includes a horizontal interpolation hardware module 18 and a vertical interpolation software module 20, wherein the horizontal interpolation hardware module 18 processes the raw images 24 on a row-by-row basis and the vertical interpolation software module 20 processes intermediate image data 26 (26a-26b) on a column-by-column basis. In one example, the raw images 24 may include Bayer pattern images in which each row contains either red-green (R/G) data or blue-green (B/G) data at full resolution.

Generally, the illustrated hardware module 18 spatially filters the raw images 24 in the horizontal direction to obtain geometrically corrected and horizontally down-sampled intermediate image data 26a, which may be stored to a buffer/memory 28 as rows are processed by the hardware module 18 (e.g., on a row-by-row basis). As will be discussed in greater detail below, each pixel in a row of the intermediate image data 26a may include red and green (R+G) values or blue and green (B+G) values, wherein these values might be expressed on any appropriate scale (e.g., 0-256, 0-4096, etc.). When a sufficient number of rows have been processed by the hardware module 18 for the vertical interpolation software module 20 to begin processing columns (e.g., five rows before+five rows after a row in question=eleven rows), intermediate image data 26b may be retrieved from the memory 28 on a column-by-column basis. Each pixel in a column of the intermediate image data 26b might include R+G values or B+G values.

The illustrated software module 20 may be implemented as a set of instructions which, if executed by a processor, cause the software module 20 to spatially filter the intermediate image data 26b in a vertical direction to obtain geometrically corrected and vertically down-sampled final image data 30 that may be further processed by other software modules 32. In one example, each pixel of the final image data 30 may include red, green and blue (R+G+B, RGB) values.

Figure 2:
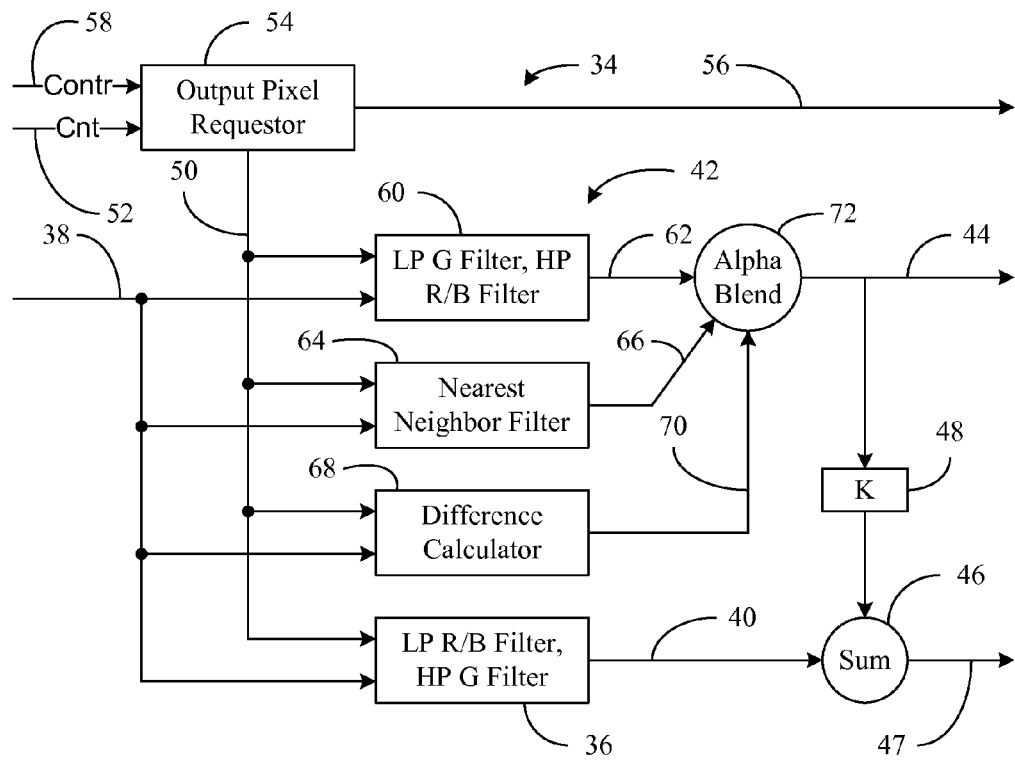
FIG. 2 is a block diagram of an example of a horizontal interpolation hardware module according to an embodiment.

FIG. 2 shows one example of a horizontal interpolation hardware module 34. The hardware module 34, which may be readily substituted for the hardware module 18 (FIG. 1), already discussed, might be implemented as embedded logic in fixed-functionality hardware using circuit technology such as application specific integrated circuit (ASIC), complementary metal oxide semiconductor (CMOS) or transistor-transistor logic (TTL) technology, or any combination thereof.

In the illustrated example, the hardware module 34 processes a raw pixel stream 38 having alternating R/G and B/G lines and uses a low pass (LP) R/B filter 36 to determine R/B average values 40 (e.g., R/B_AV) for pixels in the raw image on a row-by-row basis. Thus, the pixels of each row output from the LP R/B filter 36 might have either a red or a blue value based on the filter coefficients established for the LP R/B filter 36. These coefficients can be set via a coefficient line 50 from an output pixel requestor 54 based on a pixel position obtained from a pixel counter input 52. For example, the coefficients established by the output pixel requestor 54 may depend on the exact sampling point relative to the input raw data grid. The illustrated output pixel requestor 54 may also select the filter coefficients for a green module 42, discussed in greater detail below. In addition, the output pixel requestor 54 may generate a valid output flag 56 based on a down-sample rate (e.g., 1.875) obtained from a control signal 58.

The hardware module 34 may also include a green module 42 to determine green values 44 (e.g., G_OUT) for pixels in the raw image on a row-by-row basis. A multiplication module 48 (e.g., having multiplication value "K") and a summation module 46 can be used to correct the R/B average values 40 based on the green values 44, wherein the LP R/B filter 36 could also include a high pass (HP) green (G) filtering component to capture the derivative of the green pixels in each row. The HP G filtering component may be associated with the value (i.e., "K") of the multiplication module 48. As a result, corrected R/B values 47 may be output from the summation module 46, wherein each pixel in a row can have a green value 44 and a corrected R/B value 47 (i.e., either R+G or B+G).

In the illustrated example, the green module 42 includes an LP G filter 60 to determine a green average value 62 (e.g., G_AV) for pixels in the raw image on a row-by-row basis. Thus, each green average value 62 may represent the average green value over a certain number of pixels in a row. The LP G filter 60 could also have an HP R/B filtering component to capture the derivative of the R/B pixels in each row. In addition, a green nearest neighbor filter 64 can be used to calculate a green nearest neighbor value 66 (e.g., G_NN) for pixels in the raw image on a row-by-row basis. Each green nearest neighbor value 66 may therefore indicate the green value of the nearest pixel in the row (e.g., the pixel on either side of the pixel in question). The filters of the green module 42 and the LP R/B filter 36 may include polyphase filters designed to support a wide range of sampling ratios.

The illustrated green module 42 also includes a difference calculator 68 to calculate relative weights for the green average values 62 and the green nearest neighbor values 66 based on a difference calculation for pixels in the raw image on a row-by-row basis. The relative weights might be expressed in a single parameter signal 70 (e.g., alpha), wherein a blend module 72 can be used to calculate the green values 44 based on the green average values 62, the green nearest neighbor values 66, and the relative weights reflected in signal 70. For example, the blend module 72 might use the following expression to calculate each green value, $$\text{blend\_out} = \text{alpha} * G\_NN + (1-\text{alpha}) * G\_AV \quad (1)$$

Thus, as the calculated row-based pixel difference (alpha) increases, an edge/border is more likely to be present in the row of the image and the green values 44 can be more heavily weighted towards the green nearest neighbor values 66 to better capture the edge/border. Alternatively, as the calculated row-based pixel difference decreases, the row of the image is likely to be smooth in texture and the green values may be more heavily weighted towards the green average values 62. Simply put, the larger the variability in a certain direction, the narrower the interpolation in that direction.

Figure 3:
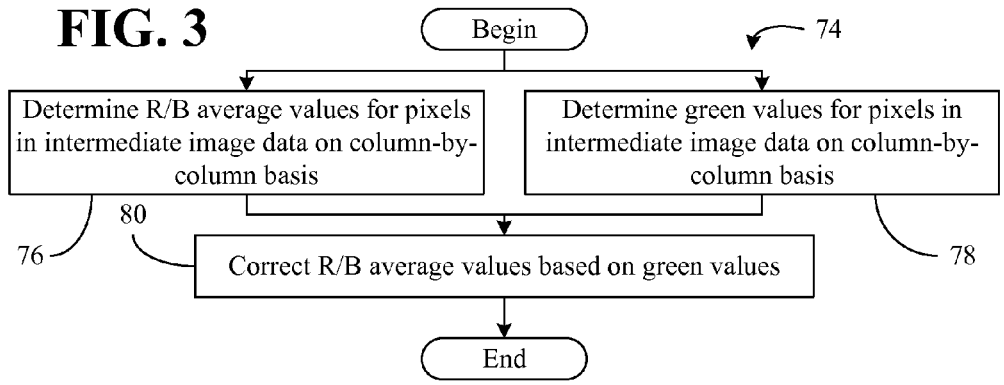
FIG. 3 is a flowchart of an example of a method of conducting vertical interpolation according to an embodiment.

Turning now to FIG. 3, a method 74 of spatially filtering intermediate image data in a vertical direction is shown. The illustrated method 74 is generally a software implementation on the columns of the image using an approach similar to the approach used in the hardware module 34 (FIG. 2), already discussed. The method 74 may be implemented as a set of executable instructions stored in a machine- or computer-readable storage medium such as random access memory (RAM), read only memory (ROM), programmable ROM (PROM), flash memory, etc. For example, computer program code to carry out operations shown in the method 74 may be written in any combination of one or more programming languages, including an object oriented programming language such as C++ or the like and conventional procedural programming languages, such as the "C" programming language or similar programming languages.

Processing block 76 provides for determining R/B average values for pixels in the intermediate image data on a column-by-column basis and processing block 78 provides for determining green values for pixels in the intermediate image data on a column-by-column basis. In addition, the R/B average values may be corrected based on the green values at block 80.

Figure 4:
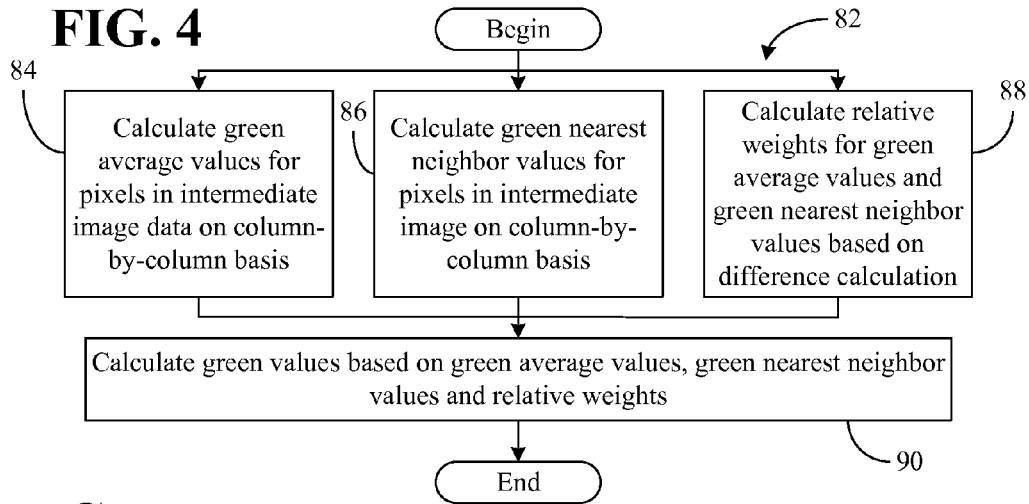
FIG. 4 is a flowchart of an example of a process of determining green values on a column-by-column basis according to an embodiment.

FIG. 4 shows one approach to determining green values for pixels in intermediate image data in method 82. Thus, method 82 may be readily substituted for processing block 78 (FIG. 3), already discussed. In particular, illustrated block 84 provides for calculating a green average value for pixels in the intermediate image data on a column-by-column basis, and block 86 provides for calculating a green nearest neighbor value for pixels in the intermediate image data on a column-by-column basis. Relative weights for the green average values and the green nearest neighbor values can be calculated at block 88 based on a difference calculation for pixels in the intermediate image data on a column-by-column basis. Illustrated block 90 provides for calculating the green values based on the green average values, the green nearest neighbor values and the relative weights.

Figure 5:
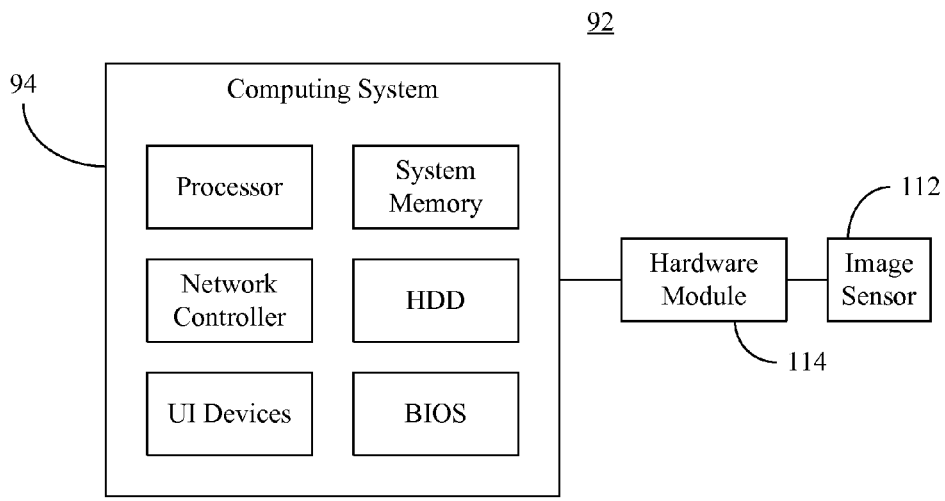
FIG. 5 is a block diagram of an example of a platform according to an embodiment.

Turning now to FIG. 5, a platform 92 having a computing system 94 with a processor, system memory, a network controller, BIOS (basic input/output system) memory that might be implemented as a plurality of NAND memory devices or other NVM (non-volatile memory), a HDD (hard disk drive), and UI (user interface) devices such as a display, keypad, mouse, etc. in order to allow a user to interact with and perceive information from the platform 92. The platform 92 could be part of a mobile platform such as a laptop, mobile Internet device (MID), personal digital assistant (PDA), wireless smart phone, media player, imaging device, etc., or any combination thereof. The platform 92 may also be part of a fixed platform such as a personal computer (PC), server, workstation, etc. Thus, the processor of the computing system 94 may include one or more processor cores and an integrated memory controller (IMC, not shown) configured to communicate with the system memory. The system memory could include dynamic random access memory (DRAM) configured as a memory module such as a dual inline memory module (DIMM), a small outline DIMM (SODIMM), etc. The cores of the processor may execute an operating system (OS) such as a Microsoft Windows, Linux, or Mac (Macintosh) OS, and various other software applications, where each core 108 may be fully functional with instruction fetch units, instruction decoders, level one (L1) cache, execution units, and so on.

The illustrated network controller could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes.

The illustrated platform 92 also includes a digital camera image sensor 112 and a horizontal interpolation hardware module 114, wherein the image sensor 112 can generate raw images at high bit rates (e.g., from image preview and/or video capture operations) and the hardware module may spatially filter the raw images in the horizontal direction to obtain intermediate image data. Thus, the hardware module 18 (FIG.

1) and or hardware module 34 (FIG. 2), already discussed, might be readily substituted for the hardware module 114. In addition, one or more of the processor cores of the computing system 94 may execute a set of instructions to spatially filter the intermediate image data in the vertical direction. Thus, the vertical interpolation software module 20 (FIG. 1), already discussed, may be readily executed by the processor cores of the computing system 94. The instructions to spatially filter the intermediate image data could be stored in internal caches of the processor cores, the system memory, the HDD, BIOS memory, or other suitable computer readable storage medium.

Figure 6A:
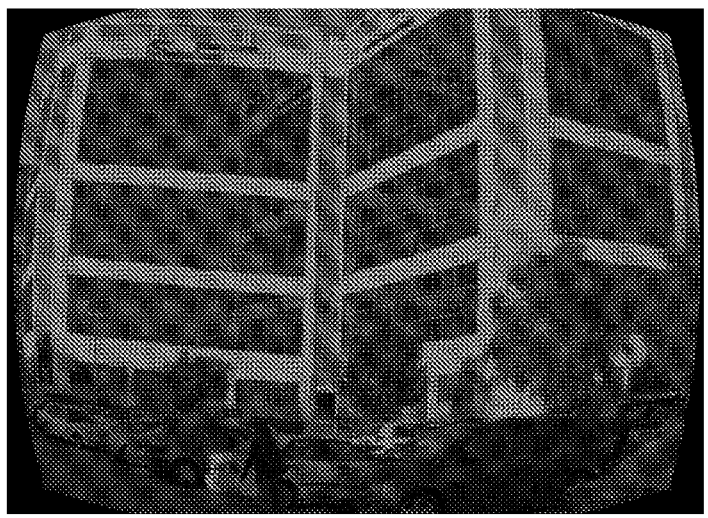
FIGS. 6A-6C are illustrations of examples of image data according to an embodiment.
Figure 6B:
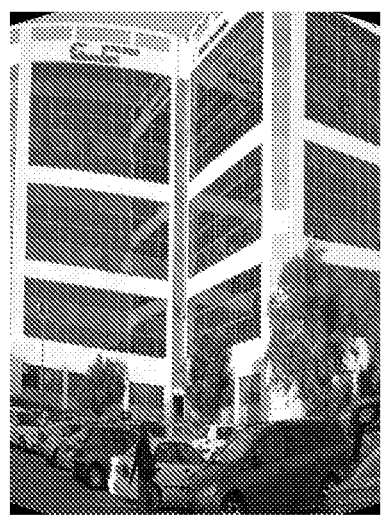
Figure 6C:
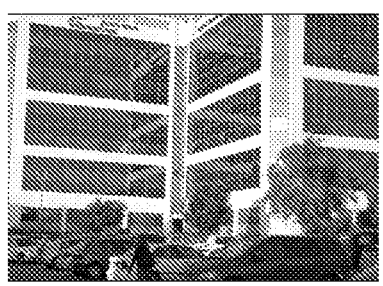

FIGS. 6A-6C demonstrate the advantages of processing a raw image 118 according to the techniques described herein. The illustrated raw image 118 has radial barrel distortion and partial color information where only one color value out of R/G/B is known at each pixel. After spatial filtering in the horizontal direction, an intermediate image 120 is semi de-mosaiced, down-sampled (e.g., by a factor of 1.875 in the horizontal direction), and partially distortion corrected. A fully de-mosaiced, down-sampled, and distortion corrected final image 122 is also shown after spatially filtering the intermediate image 120 in the vertical direction.

The above described techniques may therefore provide an efficient image processing implementation that produces high quality results when the data is captured at high rates. In addition, combining minimized dedicated hardware with software processing can enable mobile computers and/or smaller handheld devices to stay within performance and power consumption requirements.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A system comprising:
a processor;
an image sensor to generate a raw image;
a hardware module to spatially filter the raw image in a horizontal direction to obtain intermediate image data, each pixel in a row of the intermediate image data including red plus green values or blue plus green values;

a computer readable storage medium including a set of stored instructions which, if executed by the processor, cause the system to spatially filter the intermediate image data in a vertical direction, each pixel in a column of the intermediate image data including red plus green values or blue plus green values; and an output pixel requestor to select coefficients for a first filter and a green module based on pixel position, and to generate a valid output flag based on a down-sample rate wherein the hardware module includes:

the first filter to determine red-blue average values for pixels in the raw image on a row-by-row basis;

the green module to determine green values for pixels in the raw image on a row-by-row basis; and a summation module to correct the red-blue average values based on the green values.

2. The system of claim 1, wherein the green module includes:

a second filter to calculate a green average value for pixels in the raw image on a row-by-row basis;

a third filter to calculate a green nearest neighbor value for pixels in the raw image on a row-by-row basis a difference calculator to calculate relative weights for the green average values and the green nearest neighbor values based on a difference calculation for pixels in the raw image on a row-by-row basis; and a blend module to calculate the green values based on the green average values, the green nearest neighbor values and the relative weights.

3. The system of claim 1, wherein the instructions, if executed, cause the system to:

determine red-blue average values for pixels in the intermediate image data on a column-by-column basis, determine green values for pixels in the intermediate image data on a column-by-column basis, and correct the red-blue average values based on the determined green values.

4. An apparatus comprising:

a hardware module to spatially filter a raw image in a horizontal direction to obtain intermediate image data, each pixel in a row of the intermediate image data including red plus green values or blue plus green values;

a computer readable storage medium including a set of stored instructions which, if executed by a processor, cause the apparatus to spatially filter the intermediate image data in a vertical direction, each pixel in a column of the intermediate image data including red plus green values or blue plus green values; and an output pixel requestor to select coefficients for a first filter and a green module based on pixel position, wherein the hardware module includes:

the first filter to determine red-blue average values for pixels in the raw image on a row-by-row basis;

the green module to determine green values for pixels in the raw image on a row-by-row basis; and a summation module to correct the red-blue average values based on the green value.

5. The apparatus of claim 4, wherein the green module includes:

a second filter to calculate a green average value for pixels in the raw image on a row-by-row basis;

a third filter to calculate a green nearest neighbor value for pixels the raw image on a row-by-row basis;

a difference calculator to calculate relative weights for the green average values and the green nearest neighbor values based on a difference calculation for pixels in the raw image on a row-by-row basis; and a blend module to calculate the green values based on the green average values, the green nearest neighbor values and the relative weights.

6. The apparatus of claim 5, further including a multiplication module disposed between the blend module and the summation module to adjust the green values.

7. The apparatus of claim 5, wherein the second filter includes a high pass red-blue filter.

8. The apparatus of claim 4, wherein the output pixel requestor is to generate a valid output flag based on a down-sample rate.

9. The apparatus of claim 4, wherein the first filter includes a high pass green filter.

10. The apparatus of claim 4, wherein the instructions, if executed, cause the apparatus to:

determine red-blue average values for pixels in the intermediate image data on a column-by-column basis, determine green values for pixels in the intermediate image data on a column-by-column basis, and correct the red-blue average values based on the green values.

11. The apparatus of claim 10, wherein the instructions, if executed, cause the apparatus to:

calculate a green average value for pixels in the intermediate image data on a column-by-column basis, calculate a green nearest neighbor value for pixels in the intermediate image data on a column-by-column basis, calculate relative weights for the green average values and the green nearest neighbor values based on a difference calculation for pixels in the intermediate image data on a column-by-column basis, and calculate the green values based on the green average values, the green nearest neighbor values and the relative weights.

12. The apparatus of claim 4, wherein the raw image is to include a Bayer pattern image resulting from at least one of an image preview operation and a video record operation.

13. A method comprising:

using a hardware module to spatially filter a raw image in a horizontal direction to obtain intermediate image data, each pixel in a row of the intermediate image data including red plus green values or blue plus green values; and using software to spatially filter the intermediate image data in a vertical direction, each pixel in a column of the intermediate image data including red plus green values or blue plus green values, wherein using the software to spatially filter the intermediate image data includes determining red-blue average values in the intermediate image data on a column-by-column basis, determining green values for pixels in the intermediate image data on a column-by-column basis, correcting the red-blue average values based on the green values, calculating a green average value for pixels in the intermediate image data on a column-by-column basis, calculating a green nearest neighbor value for pixels in the intermediate image data on a column-by-column basis, calculating relative weights for the green average values and the green nearest neighbor values based on a difference calculation for pixels in the intermediate image data on a column-by-column basis, and calculating the green values based on the green average values, the green nearest neighbor values and the relative weights.

14. The method of claim 13, wherein using the hardware module to spatially filter the raw image includes:
   applying a first filter to the raw image to determine red-blue average values for pixels in the raw image on a row-by-row basis;
   applying a green module to the raw image to determine green values for pixels in the raw image on a row-by-row basis; and
   using a summation module to correct the red-blue average values based on the green values.

15. The method of claim 13, wherein the raw image includes a Bayer pattern image resulting from at least one of an image preview operation and a video record operation.

* * * * *